(12) United States Patent
Wander et al.

(10) Patent No.: US 9,225,446 B2
(45) Date of Patent: Dec. 29, 2015

(54) METHODS AND APPARATUS FOR MINIMIZING WANDER GENERATION IN CONSTANT BIT RATE ASYNCHRONOUSLY MAPPED DIGITAL TRANSPORT SYSTEMS

(75) Inventors: Arvinderpal S. Wander, Fremont, CA (US); Edward E. Sprague, Woodside, CA (US); Mallikarjun Chillal, Saratoga, CA (US); Prasad Paranjape, Fremont, CA (US); Yeongho Park, Palo Alto, CA (US); Michael Kutty K. G., Karnataka (IN)

(73) Assignee: Infinera Corporation, Sunnyvale, CA (US)

( * ) Notice: Subject to any disclaimer, the term of this patent is extended or adjusted under 35 U.S.C. 154(b) by 152 days.

(21) Appl. No.: 12/960,080

(22) Filed: Dec. 3, 2010

(65) Prior Publication Data
US 2012/0144059 A1  Jun. 7, 2012

(51) Int. Cl.
*H04J 3/16* (2006.01)
*H04J 3/07* (2006.01)
(52) U.S. Cl.
CPC *H04J 3/1658* (2013.01); *H04J 3/07* (2013.01)
(58) Field of Classification Search
CPC .......... G06F 15/781; H04J 3/1658; H04J 3/07
See application file for complete search history.

(56) References Cited

U.S. PATENT DOCUMENTS

| 4,573,140 A * | 2/1986 | Szeto .............................. 710/52 |
| 7,107,393 B1 * | 9/2006 | Sabih ............................ 711/109 |
| 2002/0146023 A1 * | 10/2002 | Myers ........................... 370/412 |
| 2002/0154640 A1 * | 10/2002 | Wei ................................ 370/401 |
| 2005/0092848 A1 * | 5/2005 | Beit-Grogger et al. ....... 235/492 |
| 2009/0103609 A1 * | 4/2009 | Jiang et al. ............... 375/240.03 |

OTHER PUBLICATIONS

Author: Peter Scholander, Chris Autry and Henry Owen Title: Mapping wander in sonet/sdh adaptive threshold modulation pointer processors Date: Jun. 1997 Publication: IEEE conference publication.*

* cited by examiner

*Primary Examiner* — Chirag Shah
*Assistant Examiner* — Rina Pancholi
(74) *Attorney, Agent, or Firm* — Dunlap Codding P.C.; David L. Soltz

(57) ABSTRACT

A client receive circuit receives client data from a network, decodes the client data and stores the client data within the memory. A frame transmit circuit is provided that includes a justification control logic and a framer and a justification control logic is provided that 1) determines each of a plurality of fill levels and 2) determines an average of the plurality of fill levels. The framer has circuitry to generate a wrapper including a justification opportunity having data based upon a difference between the average and a predetermined threshold.

19 Claims, 10 Drawing Sheets

PRIOR ART

METHODS AND APPARATUS FOR MINIMIZING WANDER GENERATION IN CONSTANT BIT RATE ASYNCHRONOUSLY MAPPED DIGITAL TRANSPORT SYSTEMS

FIELD OF THE DISCLOSURE

The disclosure generally relates to methods and apparatuses for minimizing wander generation in constant bit rate asynchronously mapped digital transport systems. More particularly, but not by way of limitation, the disclosure relates to methods and apparatuses to diminish or mitigate the amount of unwanted wander generated by each decoding/encoding process at each intermediate node on the regenerated egress client clock.

BACKGROUND

In digital communications systems it is often advantageous to embed a client signal for transport in a wrapper 10 (see FIG. 1), which is a repetitive frame format of fixed length and repetition rate. The wrapper 10 is also referred to herein as a "frame". Often, it is advantageous for the wrapper 10 to have a frequency that is not locked (is asynchronous or plesiochronous) to the embedded client signal. Furthermore, it is sometimes advantageous to maintain, at the client egress, the exact bit rate that the client had upon ingress. Such a relationship can be required, for example, when the exact bit sequence is replicated from ingress to egress.

Such systems use a constant bit rate (CBR) mapping scheme that allows for the mapping of arbitrary client protocols into the wrapper 10. The wrapper 10 is generated with the aid of a free-running read clock 12 that is shown, for example, in FIG. 2. The read clock 12 can be a free-running oscillator and is independent of the input client signal. The wrapper 10 consists of an overhead section 14, and a payload section 15 having multiple client data sections 16 (three being shown and designated by reference numerals 16a, 16b and 16c by way of example), one or more variable stuff section(s) 17, and one or more fixed stuff sections 18 (three being shown and designated by reference numerals 18a, 18b, and 18c by way of example). The lengths of the variable stuff sections 17 and fixed-stuff sections 18 are client specific and are chosen such that a wrapper payload bandwidth is roughly equivalent to that of the client. The payload section 15 of the wrapper 10 consists of N groups for client data, and each variable stuff section 17 may be used to transport client data.

However, even with the fixed stuffing, the mapping of the client signal to the payload section 15 is not exact and "asynchronous mapping" may be used. In asynchronous mapping, there are, in addition to the client data sections 16, the variable stuff sections 17 that contain, or do not contain, client data in a given wrapper 10. By variably 'stuffing' (inserting null data) in these variable stuff sections 17 or inserting actual client data, the client signal may be transported in a bit-for-bit transparent manner, and the ingress and egress client frequencies are exactly the same, when measured over the long term. The variable stuff sections 17 are often called "justification opportunities" and the terms "variable stuff sections" and "justification opportunities" are used interchangeably herein. In a given wrapper 10, it must be signaled from the transmitter to the receiver whether or not each justification opportunity 17 carries data or stuffing. The signaling is accomplished with the aid of one or more bits in the overhead section 14.

FIG. 2 shows a typical asynchronous mapping system 30 for decoding and encoding client data. The asynchronous mapping system 30 includes a client receive circuit 32, a First-in, First-out (FIFO) memory 34 and a frame transmit circuit 36. The client receive circuit 32 includes a clock and data recovery circuit 40, a FIFO write clock 42 and a serial-to-parallel converter 44. The client data is received by the clock and data recovery circuit 40, and forwards serial data to the serial-to-parallel converter 44, which converts the serial data to a series of parallel n-bit words. This is done to limit the rate at which an individual data signal can be toggled, such that the data processing can be performed in a low-cost, high-density logic device, for example, CMOS. Each n-bit word is entered into the (FIFO) memory 34. The FIFO write clock 42 is derived from the client clock decoded by the clock and data recovery circuit 40, divided by n, where n is the parallel data width.

The frame transmit circuit 36 includes a framer 50, a parallel to serial converter 52, the free-running read clock 12, and a justification control logic 56. The wrapper 10 to be transmitted is constructed by the framer 50 that is synchronous with the wrapper clock, which may be driven by the free-running read clock 12. A wrapper data source, per n-bit wrapper word is selected by the framer 50. For fixed client data locations, the data is derived from the FIFO memory 34. For justification opportunities 17, the wrapper data is derived from either the FIFO memory 34 or a stuff value, depending upon a FIFO fill level of the FIFO memory 34. If the FIFO fill level is above a threshold, the framer 50 may place data in the justification opportunity 17. When the FIFO fill level is below a threshold, the framer 50 may stuff the justification opportunity 17 with null data. The FIFO fill level is monitored by the justification control logic 56. Data indicative of justification control is also inserted in the overhead section 14 of the wrapper 10 in order to inform an edge node 60 (see FIG. 3) whether each justification opportunity 17 contains data or stuffing.

FIG. 3 shows a client decapsulation circuit 61 running on the edge node 60 for providing client data into a client network. Again, for efficiency the received signal is converted to a parallel n-bit wide data path (it is not necessary that the receiver data path width match the transmitter data path width) by the serial to parallel converter 44. The edge node 60 distinguishes client data (including justification opportunities 17) within the wrapper 10 and stores the client data only in the FIFO memory 34. Separately, the clock and data recovery circuit 40 of the edge node 60 synthesizes a client clock by processing a received wrapper clock, fixed client data locations, and the justification control channel. The client decapsulation circuit 61 also includes a client clock synthesis circuit 66 that reads data from the decoded wrapper 10 indicative of the justification opportunity 17 and uses such data to regenerate or synthesize the client clock, which is referred to herein as a regenerated egress client clock. Signals indicative of the regenerated egress client clock are provided to a client framer 67 which functions to form the wrapper 10 with the client data and transmit the wrapper 10 to a parallel to serial converter 68. The parallel to serial converter 68 converts the wrapper 10 into a serial form and then provides the converted wrapper 10 to the client's network.

Often it is desired to pass a given client signal that is encoded in the above manner through a series of one or more intermediate nodes, wherein each intermediate node generates a wrapper 10 that is plesiochronous with the other wrappers 10. As before, each wrapper 10 may contain more than one client signal, and at each intermediate node, the multiple clients may be switched and combined in different wrappers 10. At each such intermediate node, the client data must be recovered from the upstream node wrapper and re-encoded downstream to the next node. The client phase information must likewise be recovered and re-encoded.

In the bit-for-bit transmission of client signals, it is often advantageous or even required to minimize the generation of jitter and wander via the overall transmission processes. Jitter and wander generation represent a deviation in time from the temporal position of each transmitted bit or symbol at which it was received at the client ingress (neglecting a fixed transport delay). Frequency components of this deviation above 10 Hz are termed "jitter" and components below 10 Hz are termed "wander". For example, minimal jitter and wander generation is required for the transmission of client signals using SONET/SDH.

As described above, the conventional method for making the justification decision relies on sampling a current FIFO fill level 69 (or the amount of client data stored in the FIFO memory 34) at fixed intervals. The FIFO memory 34 is instantaneously sampled immediately before the justification opportunity 17 in the wrapper 10 and compared to a minimum threshold 72. Since the frame format is fixed, sample points 70a, 70b and 70c occur at fixed intervals with respect to the operating clock frequency as shown in FIG. 4.

The FIFO fill level 69 at any given moment is a function of the real-time performance of the client receive circuit 32 and the frame transmit circuit 36. The client receive circuit 32 and the frame transmit circuit 36 can be viewed as ON/OFF processes. Consider for example FIG. 5, when the client receive circuit 32 is writing client data into the FIFO memory 34 and the frame transmit circuit 36 is not reading; during such periods the FIFO fill level 69 of the FIFO memory 34 will naturally grow in length. The relative speed at which the client receive circuit 32 inputs data into the FIFO memory 34 and the frame transmit circuit 36 removes data from the FIFO memory 34 creates variations in the FIFO fill level 69 of the FIFO memory 34. The ON/OFF signature depends on the format of the frame.

Given the plesiochronous nature of the write and read clocks 42 and 12, both the write clock 42 and the read clock 12 operate at the same nominal frequency with only a slight frequency mismatch. Therefore, the operating frequency of one wrapper 10 will always be slightly faster than the other. This mismatch is generally quantified in units of parts per million. Unlike FIG. 4 above, the sample point at which the justification decision is made will vary from one frame to the next. This is illustrated in FIG. 6. It should be evident that the sample point will cycle though the entire wrapper 10 and how quickly it cycles depends directly on the parts per million differences.

The problem with this approach lies in the fact that the justification opportunities 17 will mimic the behavior of the FIFO memory 34. This is illustrated in FIG. 7. During a first epoch (E1), each instantaneous sample obtained during consecutive frame periods shows the FIFO fill level 69 to be below the minimum threshold, therefore, a larger number of the justification opportunities 17 are stuffed with null data. Note that an epoch here consists of one or more consecutive frame periods. During a next epoch (E2), the point has shifted such that each instantaneous sample is above the minimum threshold. Naturally, the framer 50 responds by reducing the number of justification opportunities 17 stuffed with null data. Since the signature of the justification opportunities 17 is instrumental in tuning the regenerated egress client clock, such variations can induce undesirable low-frequency wander in the regenerated egress client clock.

In a concatenated series of nodes, it is possible for any wander generated by the encoding/decoding process to be cumulative. Hence, it is increasingly important to diminish or mitigate the amount of wander generated by each decoding/encoding process to achieve a given net result.

It is evident from the discussion above that the conventional approach to making justification decisions is prone to introducing unwanted wander in the regenerated egress client clock.

Thus there is a need to diminish or mitigate the amount of unwanted wander generated by each decoding/encoding process by the regenerated egress client clock. It is to this problem that the present disclosure is directed to solving.

SUMMARY OF THE DISCLOSURE

The techniques described herein minimize the amount of wander generated by a mapping system of a network node by minimizing the effect of the sequential oscillations of the fill level on the justification decision process. This can be accomplished in a variety of manners.

In one version, the disclosure describes a mapping system including a memory, a client receive circuit and a frame transmit circuit The mapping system can be an asynchronous mapping system. The client receive circuit is adapted to receive client data from a network, decode the client data and store the client data within the memory. The frame transmit circuit includes a justification control logic and a framer. The justification control logic is executed by one or more processor to 1) determine each of a plurality of fill levels, each of the plurality of fill levels being associated with an amount of client data in the memory at each of a plurality of corresponding one of a plurality of instants of time, and 2) determine an average of the plurality of fill levels. The framer has circuitry to generate a wrapper including at least a portion of client data from the memory, the wrapper having one or more justification opportunity having data based upon a difference between the average and a predetermined threshold.

In another version, the disclosure describes an apparatus, comprising a non-transitory computer readable medium storing computer readable instructions that when executed by one or more processor cause the one or more processor to 1) determine each of a plurality of fill levels, each of the plurality of fill levels being associated with an amount of client data in a memory at each of a plurality of corresponding one of a plurality of instants of time, 2) determine an average of the plurality of fill levels, and 3) generate a wrapper including at least a portion of client data from the memory such that the wrapper has one or more justification opportunity having data based upon a difference between the average and a predetermined threshold.

In yet another version, the disclosure describes a method in which client data is passed through a memory of a network node. While the data is passing through the memory, each of a plurality of fill levels is determined. Each of the plurality of fill levels is associated with an amount of the client data in the memory at each of a corresponding one of a plurality of instants in time. An average of the plurality of fill levels is determined, and a wrapper is generated including at least one portion of client data. The wrapper has one or more justification opportunities having data based upon a difference between the average and a predetermined threshold.

These versions can be implemented in a variety of manners such as in an ingress line module and/or an egress line module of a network node. Further, the plurality of instants of time can be separated by a uniform time interval, or non-uniform time intervals. When the plurality of instants of time are separated by non-uniform time intervals, the non-uniform time intervals can be determined by a random number generator.

In other versions, the disclosure describes a mapping system, comprising a memory, a client receive circuit and a frame transmit circuit. The client receive circuit is adapted to receive client data from a network, decode the client data and store the client data within the memory. The frame transmit circuit includes a justification control logic, and a framer. The justification control logic is executed by one or more processor to determine each of a plurality of fill levels, each of the plurality of fill levels being associated with an amount of client data in the memory at each of a plurality of corresponding one of a plurality of instants of time separated by non-uniformly spaced time intervals. The framer has circuitry to generate a wrapper including at least a portion of client data from the memory. The wrapper has one or more justification opportunity having data based upon a difference between one or more fill levels and a predetermined threshold.

In yet another version, the disclosure describes an apparatus, comprising a non-transitory computer readable medium storing computer readable instructions that when executed by one or more processor cause the one or more processor to 1) determine each of a plurality of fill levels, each of the plurality of fill levels being associated with an amount of client data in a memory at each of a plurality of corresponding one of a plurality of instants of time separated by non-uniformly spaced time intervals, and 2) generate a wrapper including at least a portion of client data from the memory such that the wrapper has one or more justification opportunity having data based upon a difference between one or more fill levels and a predetermined threshold.

In a further version, the disclosure describes a method in which client data is passed through a memory of a network node. A plurality of fill levels are determined while the client data is passed through the memory with each of the plurality of fill levels being associated with an amount of the client data in the memory at each of a corresponding one of a plurality of instants in time separated by non-uniformly spaced time intervals and then a wrapper is generated with the wrapper including at least one portion of client data. The wrapper has one or more justification opportunities having data based upon a difference between one or more fill levels and a predetermined threshold.

BRIEF DESCRIPTION OF THE DRAWINGS

The techniques described herein minimize the amount of wander generated by a mapping system of a network node by minimizing the effect of the sequential oscillations of the fill level on the justification decision process. This can be accomplished in a variety of manners, such as by averaging multiple samples of the fill level over time for each justification decision (as shown in FIGS. 11 and 12), and/or by taking one or more samples at random time intervals (as shown in FIGS. 13-16), rather than fixed time intervals.

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Figure 4:
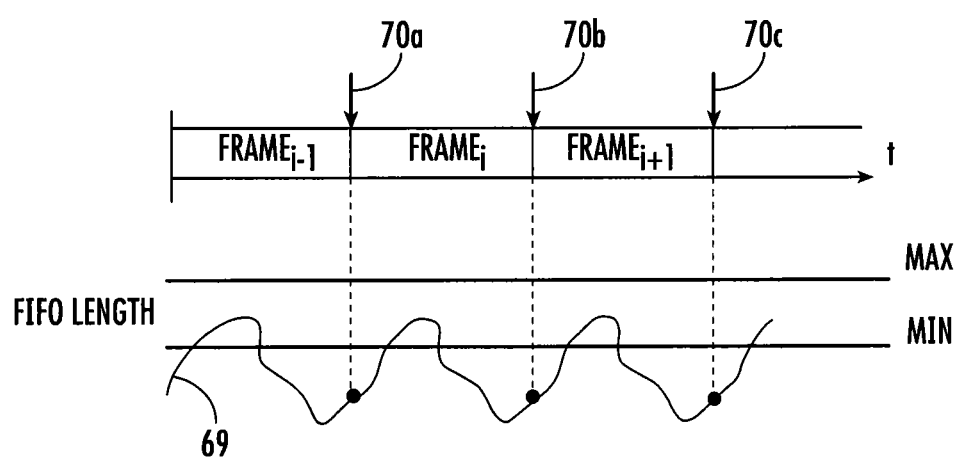
FIG. 4 is a timing diagram illustrating a plurality of fixed sample points occurring at fixed intervals with respect to an operating clock frequency.
Figure 5:
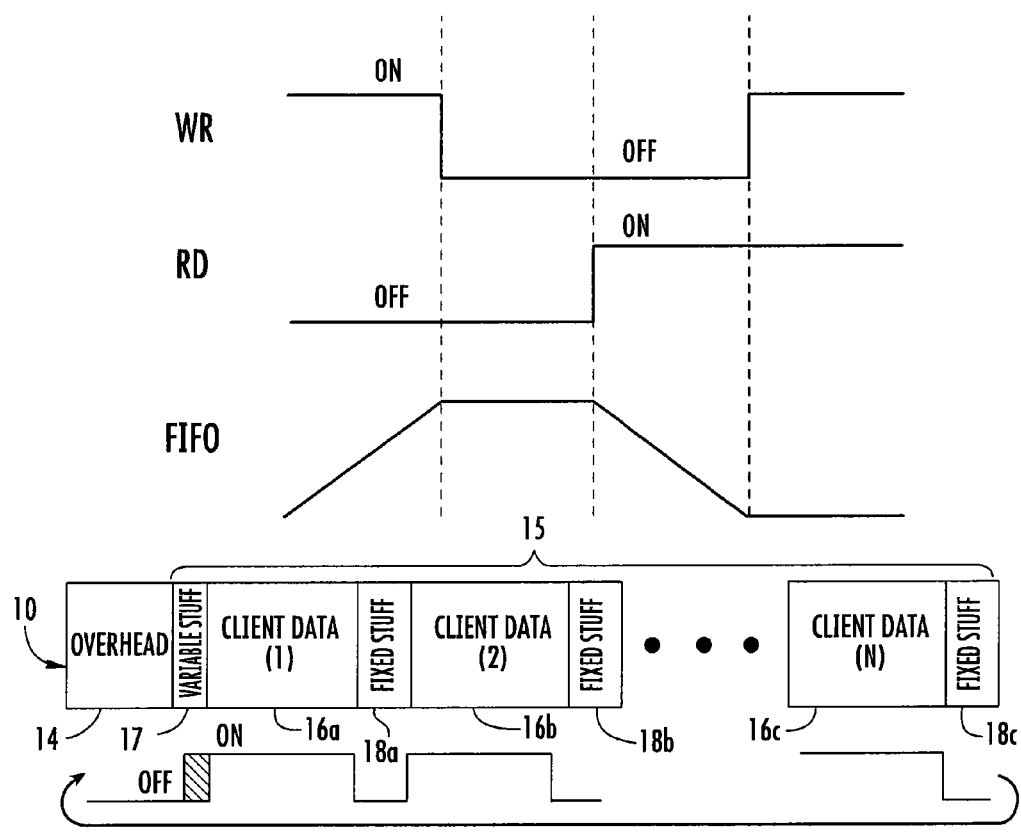
FIG. 5 is a timing diagram illustrating variations in a FIFO fill level as such FIFO fill level changes over time and depending upon the relative performance of a client receive circuit and a frame transmit circuit of the asynchronous mapping system depicted in FIG. 2.
Figure 11:
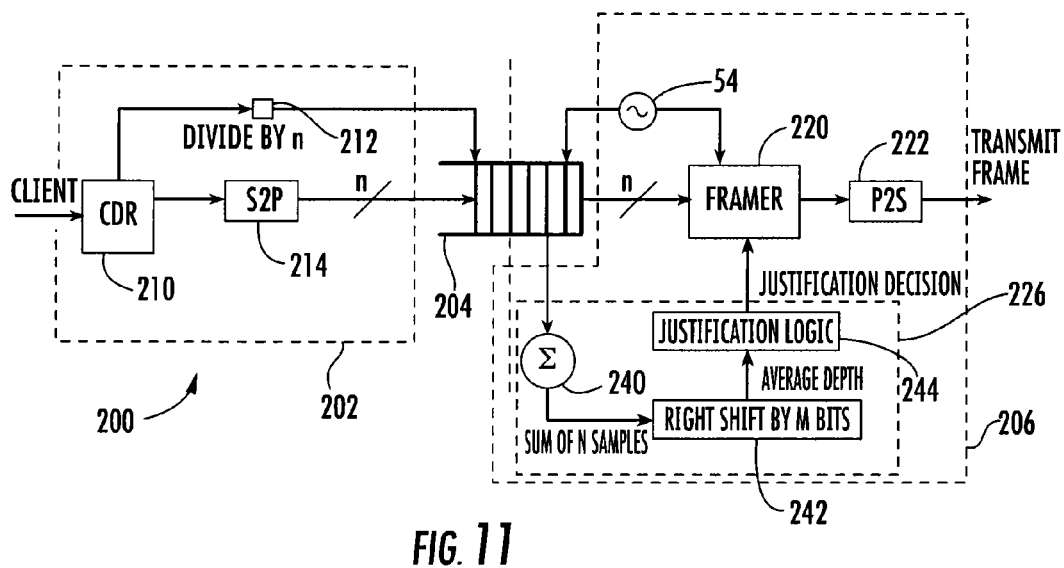
FIG. 11 is a block diagram of a mapping system constructed in accordance with the present disclosure.
Figure 12:
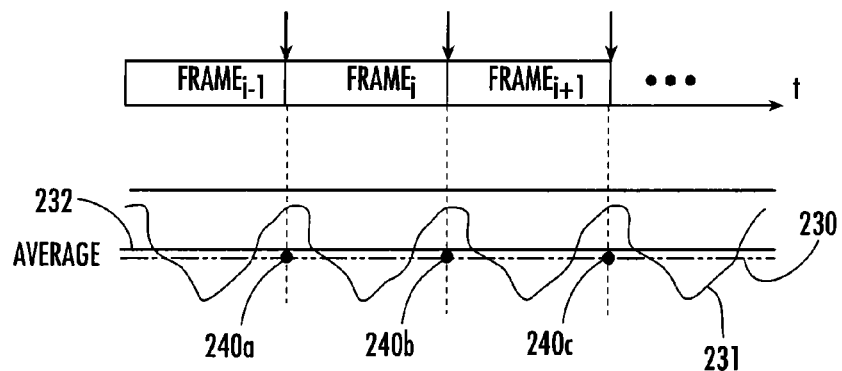
FIG. 12 is a timing diagram illustrating an instantaneous fill level, an average fill level, and a threshold with a comparison of the average fill level and the threshold being utilized to make justification decisions.

As discussed in the Background section, the conventional method on making the justification decision relies on sampling the fill level of an asynchronous FIFO memory at a fixed time instant within each mapping of the client payload into the outgoing wrapper 10. In plesiochronous systems, where both the mapper and de-mapper logic operate at the same nominal frequency, sequential oscillations of the fill level over time as shown in FIG. 4 can often contribute to undesirable wander on the regenerated client clock in the conventional method because the samples do not accurately reflect the amount of data actually passing through the FIFO memory 34. The techniques described herein can minimize the amount of wander generated by the asynchronous mapping system by minimizing the effect of the sequential oscillations of the fill level on the justification decision process. This can be accomplished in a variety of manners, such as by averaging multiple samples of the fill level over time for each justification decision (as shown in FIGS. 11 and 12), and/or by taking one or more samples at non-uniformly spaced intervals (as shown in FIGS. 13-16), rather than uniformly spaced intervals.

DEFINITIONS

If used throughout the description and the drawings, the following short terms have the following meanings unless otherwise stated:

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). GMPLS is a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Multi-Protocol Label Switching network. Note that Label Switched Paths are unidirectional; LSPs enable packets to be label switched through the Multiprotocol Label Switched network from one endpoint to another. Since bidirectional communication is typically desired, a Label Switched Path is typically set up for each direction to compensate for the unidirectional nature of the Label Switched Path.

MPLS stands for Multi-Protocol Label Switching which is a scheme in telecommunications networks for carrying data from one switch node to the next switch node. MPLS operates at an OSI model layer that is generally considered to lie between traditional definitions of layer 2 (data link layer) and layer 3 (network layer) and is thus often referred to as a layer 2.5 protocol.

OTN stands for Optical Transport Network which includes a set of optical switches which are connected by optical fiber links.

SONET/SDH stands for Synchronous Optical Networking/Synchronous Digital Hierarchy which are standardized multiplexer protocols that transfer multiple digital bit streams over optical fiber using lasers or light emitting diodes.

Rx stands for Receiver which typically refers to optical channel receivers, but can also refer to circuit receivers.

Tx stands for Transmitter which typically refers to optical channel transmitters, but can also refer to circuit transmitters.

Description of Embodiments

Figure 8:
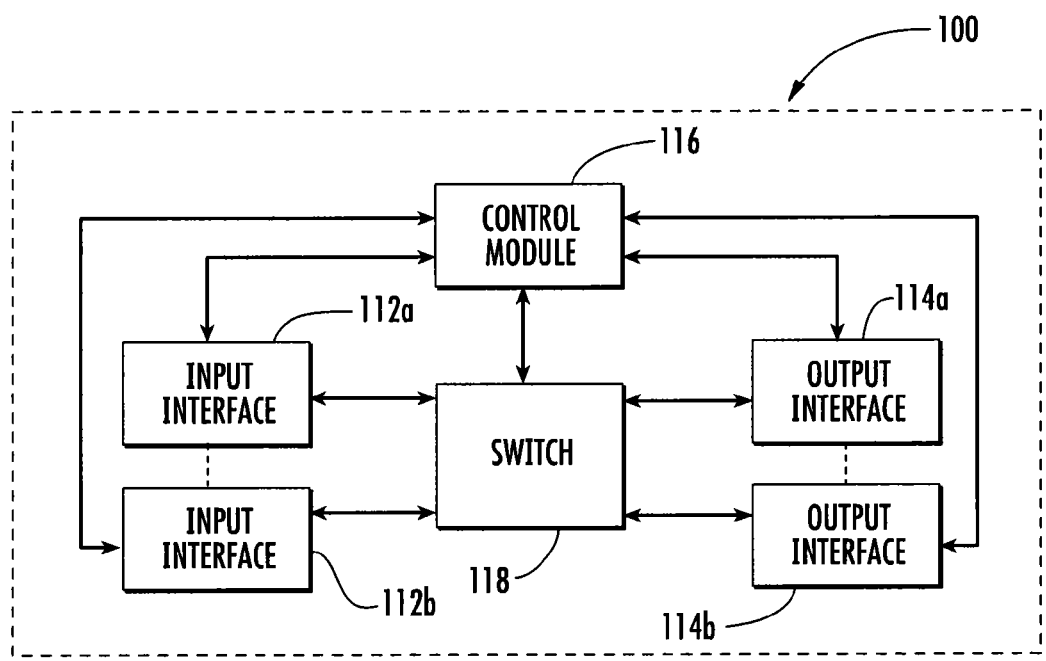
FIG. 8 is an exemplary switch node constructed in accordance with the present disclosure.
Figure 9:
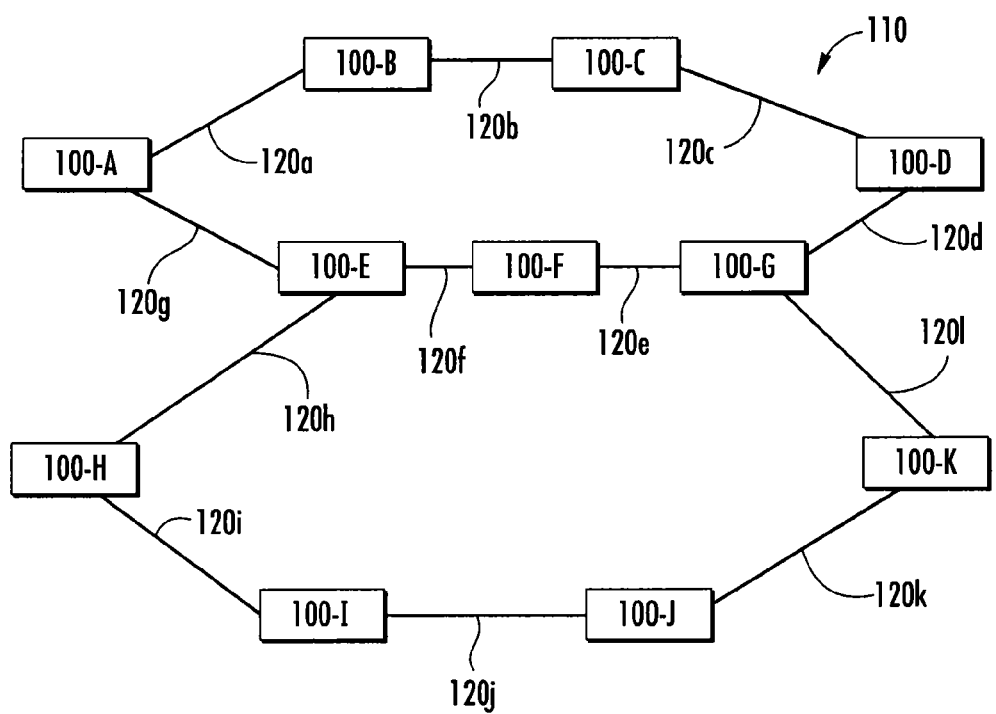
FIG. 9 is a block diagram of an exemplary network constructed in accordance with the present disclosure.

Referring now to the drawings, and in particular to FIG. 8, shown therein and designated by reference numeral 100 is an exemplary switch node constructed in accordance with the present disclosure. As will be discussed in more detail below, the network node 100 is adapted to facilitate the communication of data (which may be referred to herein as "traffic") between multiple network nodes 100 in a network 110 (as shown in FIG. 9). The network 110 can be an optical network such as a packet switched network, circuit switched network or a hybrid circuit switched/packet switched network. The network node 100 is provided with one or more input interfaces 112, one or more output interfaces 114, a control module 116, and a switch 118.

As will be discussed in more detail below, the one or more output interfaces 114 are configured to receive and transmit client data. The client data is typically user traffic transported on the network 110 for reception by one or more of the input interfaces 112 of another network node 100. The network 110 can be a time-division multiplex network such as those identified by OTN, SONET, SDH and proprietary XTP/XTF, DTP/DTF formats.

In general, the input interfaces 112 are adapted to receive user traffic from the network 110, and the output interfaces 114 are adapted to transmit user traffic onto the network 110. The switch 118 serves to communicate the user traffic from the input interface(s) 112, to the output interface(s) 114. And, the control module 116 serves to control the operations of the input interfaces 112, the output interfaces 114, and the switch 118.

The network node 100 can be implemented in a variety of manners, including, commercial installations having one or more backplanes (not shown), racks, and the like. In this example, the input interfaces 112, the output interfaces 114, the control module 116 and the switch 118 are typically implemented as separate devices, which may have their own power supply, local memory and processing equipment. In another example, the network node 100 can be implemented as a single device having a shared power supply, memory and processing equipment. Or, in another example, the network node 100 can be implemented in a modular manner in which one or more of the input interfaces 112, the output interfaces 114, the control module 116 and the switch 118 share a power supply and/or housing.

The input interfaces 112, and the output interfaces 114 of one network node 100 are adapted to communicate with corresponding input interfaces 112 of another network node 100 within the network 110 via communication links 120a-1, which are referred to herein generally as the communication links 120 (as shown in FIG. 9). An example of an interface is an Ethernet card or optical port. Each interface may have its own logical identification, such as an IP address.

The input interfaces 112 and the output interfaces 114 are shown separately for purposes of clarity. However, it should be understood that one or more of the input interfaces 112 and/or the output interfaces 114 could be connected to a single communication link 120 and implemented as a single device, such as a line module. The making and using of exemplary line modules are described in the patent application identified by publication no. 20090245289, the entire content of which is hereby incorporated herein by reference.

The communication links 120a-1 can be implemented in a variety of manners, such as a physical link including electrical (e.g., copper wire or coax) and/or optical signal (e.g., optical fiber or other waveguide) carrying capabilities, or as a wireless link. The implementation of the input interfaces 112, and the output interfaces 114 will depend upon the particular type of communication link 120 that the particular input interface 112 and/or output interface 114 is designed to communicate with. For example, one of the input interfaces 112 can be designed to communicate wirelessly with another network node 100 within the network 110, while one of the output interfaces 114 of the network node 100 can be designed to communicate optically through a fiber-optic link. For a particular network node 100, the input interfaces 112 can be of the same type or different types; the output interfaces 114 can be of the same type or different types; and the input and output interfaces 112 and 114 can be of the same type or different types.

Figure 1:
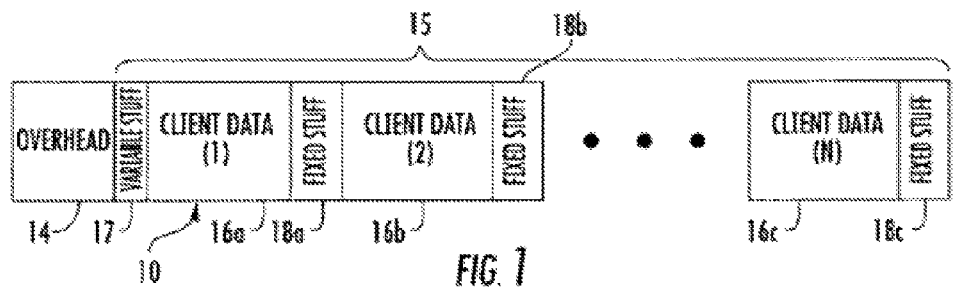
FIG. 1 is a block diagram of a prior art wrapper in which multiple client signals having been mapped into a payload section of the wrapper.
Figure 2:
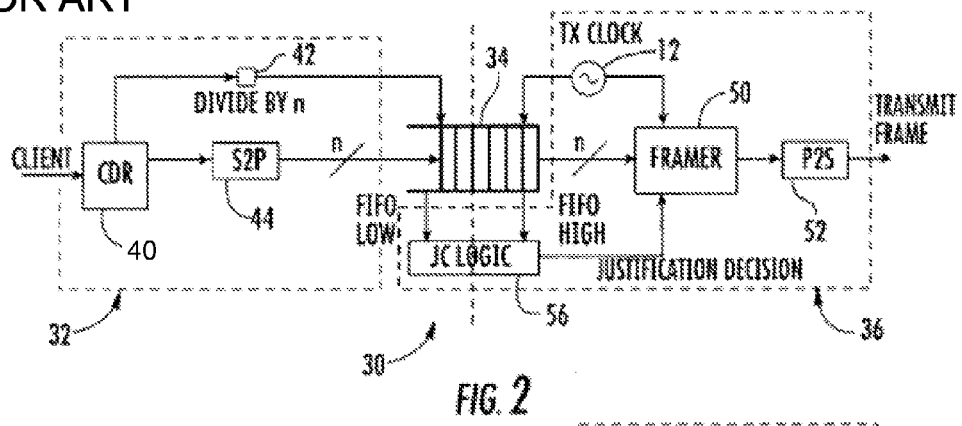
FIG. 2 shows a prior art asynchronous mapping system for decoding and encoding client data to form the wrapper depicted in FIG. 1.
Figure 10:
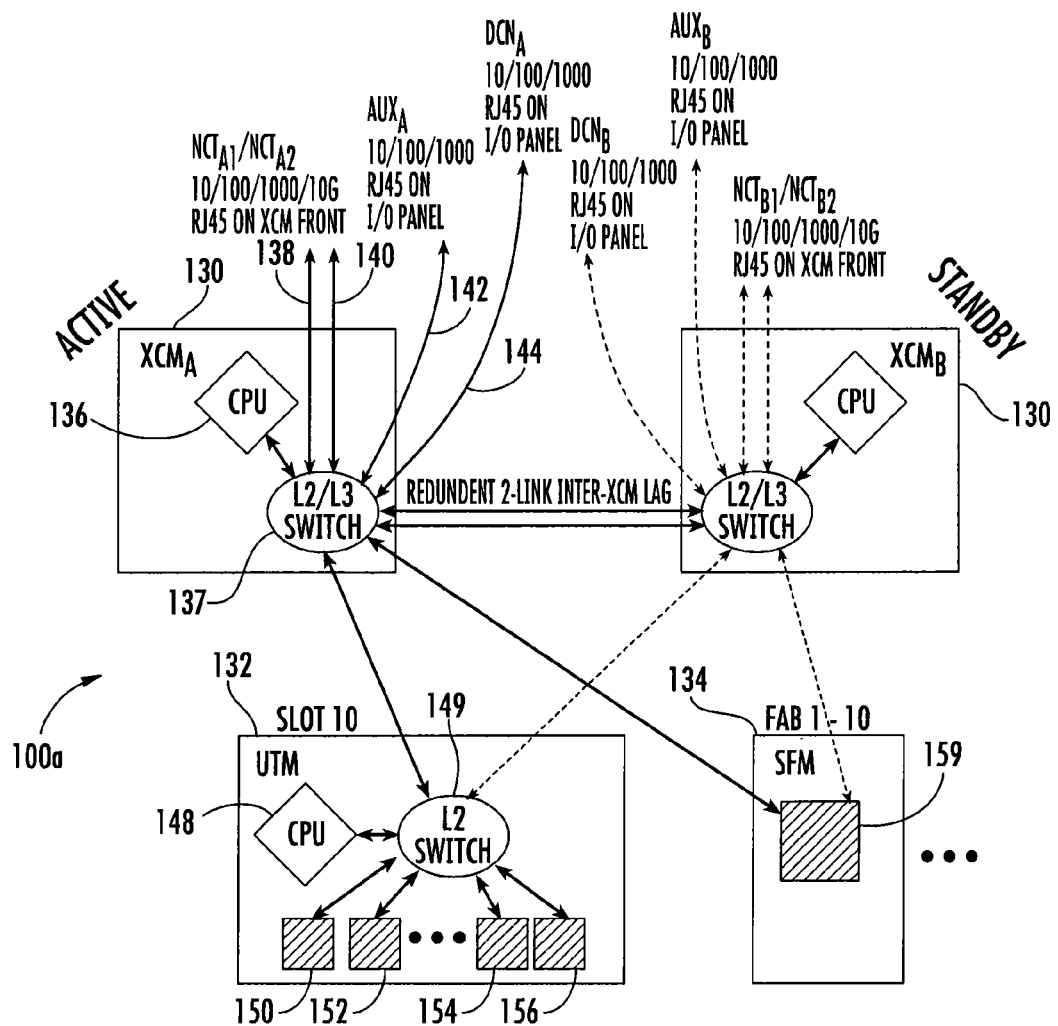
FIG. 10 is a block diagram of another version of a switch node constructed in accordance with the present disclosure.

Referring now to FIG. 10, shown therein is a particular embodiment of a network node 100a implemented in a modular manner. The network node 100a is provided with one or more exchange control modules (XCM) 130, one or more universal transport modules (UTM) 132, and one or more switch fabric modules 134. In the example depicted in FIG. 10, the network node 100a is provided with at least two exchange control modules 130, with at least one of the exchange control modules 130 being actively used, and the other one of the exchange control modules 130 being available as a backup in the event the actively used exchange control module 130 fails or is taken off-line. In general, the exchange control modules 130 are particular implementations of the control module 116 depicted in FIG. 1; the universal transport module 132 is a particular implementation of the input interfaces 112 and the output interfaces 114; and the switch fabric module 134 is a particular implementation of the switch 118.

In general, the exchange control module 130 is provided with one or more processors 136, which is shown by way of example as a CPU. However, it should be understood that the processors 136 can be implemented in other manners such as field programmable gate array(s) (FPGA), digital signal processor(s), or the like. The exchange control module(s) 130 are also provided with a L2/L3 switch 137 (i.e. Layer 2/Layer 3 switch) that switches control messages between the exchange control module 130 and the L2 switch of the universal transport module (UTM) 132. The exchange control module(s) 130 are also provided with one or more input/output interfaces which are shown by way of example as the arrows 138, 140, 142, and 144, for communicating control messages with exchange control module(s) 130 of the switch nodes 100a in the network 110.

The universal transport module 132 is provided with one or more processors 148; one or more L2 switch 149; and one or more transport interface modules 150, 152, 154, and 156 communicating with the L2 switch 149. The L2 switch 149 also communicates with the control plane L2/L3 switch 137. The one or more processors 148 is shown by way of example as a CPU; however, it should be understood that the one or more processors 148 can be implemented in other manners such as a field programmable gate array(s) (FPGA), digital signal processor(s), or the like. Certain ones of the transport interface modules 150, 152, 154 and 156 form input interfaces (also referred to herein as an ingress line module), and other ones of the transport interface modules 150, 152, 154 and 156 form output interfaces (also referred to herein as an egress line module). For example, the transport interface modules 150 and 152 can form input interfaces, and the transport interface modules 154 and 156 can form output interfaces.

The switch fabric module 134 is provided with one or more switches 159, and functions to switch data between modules 150, 152, 154 and 156 of the universal transport module 132.

The switch fabric module 134 may include hardware components, or a combination of hardware and software components, that may provide switching functions to transfer data between the transport interface modules 150, 152, 154 and 156. In one implementation, the switch fabric module 134 may provide fully non-blocking transfer of data. The switch fabric module 134 may be programmed to transfer data from a particular transport interface module 150 and/or 152 functioning as an ingress line module to a particular transport interface module 154 and/or 156 functioning as an egress line module.

Figure 3:
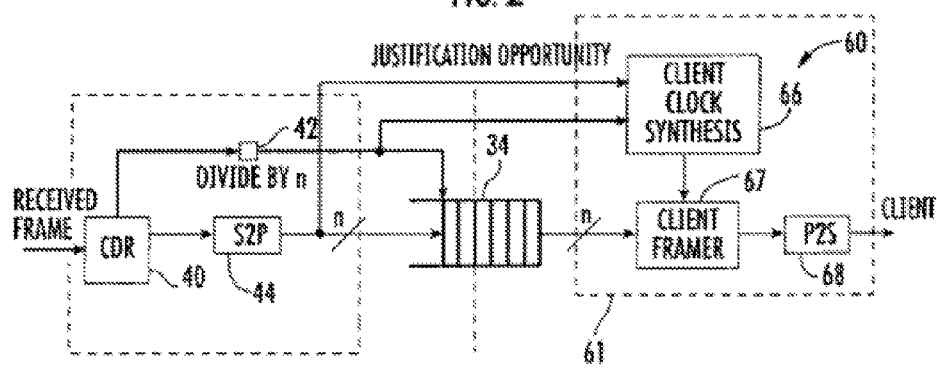
FIG. 3 is a block diagram of a prior art client decapsulation process running on a receiver.
Figure 6:
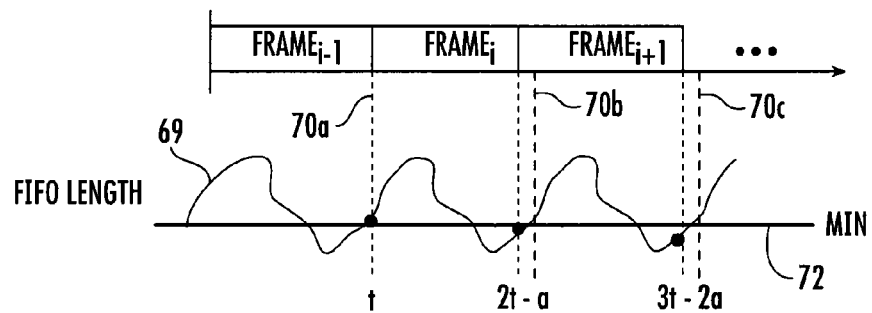
FIG. 6 is a timing diagram illustrating a plurality of fixed sample points in which an operating frequency of one wrapper is slightly faster than an operating frequency of another wrapper to cause a mismatch in the timing of the fixed sample points.
Figure 7:
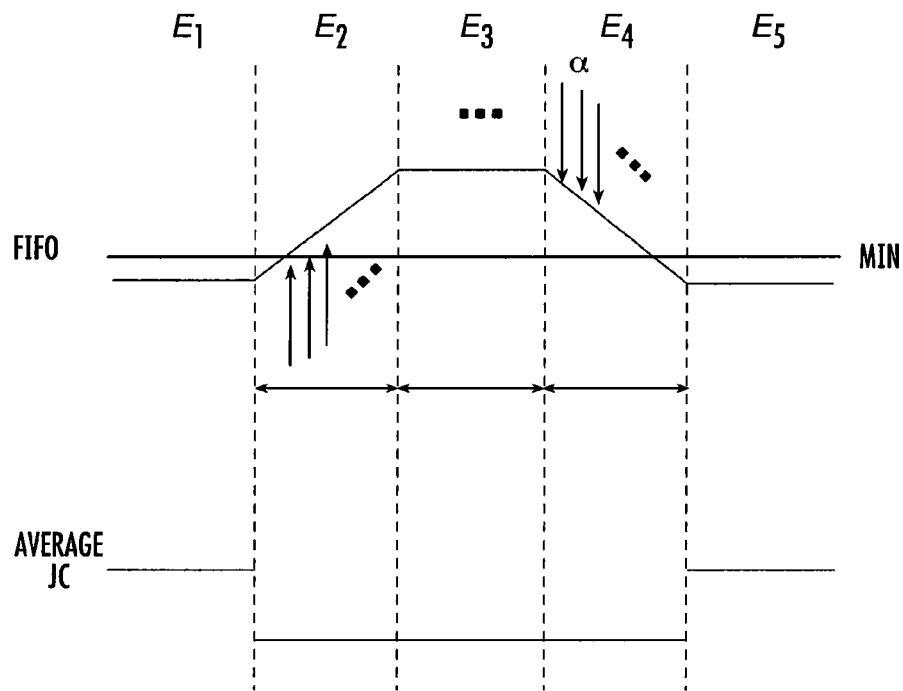
FIG. 7 is a timing diagram illustrating that prior art justification opportunities will mimic the behavior of the FIFO fill level.

Exemplary components of a line module are shown and described with reference to FIG. 3 of U.S. Patent Publication No. 20090245289, which disclosure is incorporated herein by reference. Exemplary components of the switch fabric module 134 are shown and described with reference to FIG. 6 of U.S. Patent Publication 20090245289, which disclosure is also incorporated herein by reference. It should be understood that the network nodes 100 and/or 100a can be implemented in a variety of manners including those shown and discussed in U.S. Patent Application No. 20090245289 entitled "Programmable Time Division Multiplexed Switching" the entire content of which is hereby incorporated herein by reference.

Referring now to FIG. 11, shown therein is an exemplary mapping system 200 constructed in accordance with the present disclosure for decoding and encoding client data. The mapping system 200 can be an asynchronous mapping system. The mapping system 200 includes a client receive circuit 202, a memory 204 and a frame transmit circuit 206. The client receive circuit 202 includes a clock and data recovery circuit 210, a write clock 212 and a serial-to-parallel converter 214. The client data is received by the clock and data recovery circuit 210 which forwards serial data to the serial-to-parallel converter 214. The serial-to-parallel converter 214 converts the serial data to a series of parallel n-bit words. This is done to limit the rate at which an individual data signal can be toggled, such that the data processing can be performed in a low-cost, high-density logic device, for example, CMOS. Each n-bit word is entered into the memory 204. The write clock 42 is derived from the client clock decoded by the clock and data recovery circuit 40, divided by n, where n is the parallel data width.

The memory 204 is adapted to receive the client data, store the client data and to permit retrieval of the client data. In particular, the memory 204 can be implemented in a variety of manners, such as volatile memory including static random access memory, dynamic random access memory or the like; and/or nonvolatile memory including flash memory, magnetic computer storage device, optical storage device, or the like. The memory 204 preferably includes a first in first out register.

The frame transmit circuit 206 includes a framer 220, a parallel to serial converter 222, a free-running read clock 224, and justification control logic 226. The wrapper 10 to be transmitted is constructed by the framer 220 that is synchronous with the wrapper clock, which may be driven by the free-running read clock 224. The read clock 224 can be a free-running oscillator and can be independent of the input client signal. A wrapper data source, per n-bit wrapper word is selected by the framer 220. For fixed client data locations, the data is derived from the memory 204.

In general, for justification opportunities 17, the wrapper data is derived from either the memory 204 or a stuff value, depending upon an average fill level 230 (see FIG. 12) of the memory 204 computed by taking an average of N instantaneous readings of a fill level 231. If the average fill level 230 is above a threshold 232, the framer 220 may place data in the justification opportunity. If the average fill level 230 is below a threshold, the framer 50 may stuff the justification opportunity with null data. The average fill level 230 is monitored by the justification control logic 56. Data indicative of justification control is also inserted in the overhead section 14 of the wrapper 10 in order to inform another network node 100 and/or 100a (see FIG. 9) whether each justification opportunity 17 contains data or stuffing.

In this embodiment, the average fill level 230 can be determined utilizing an averaging scheme in which an averaging window is utilized. Instead of making the decision purely on an instantaneous sample of the FIFO memory 34 as accomplished in the prior art, the average fill level 230 may be computed utilizing a programmable number N of sample points 240 with each sample point 240 taken at a particular instant in time. For example, FIG. 12 illustrates the sampling of the fill level 231 of the memory 204 at sample point 240a during Frame$_{i-1}$, sample point 240b during Frame$_i$, and sample point 240c during Frame$_{i+1}$ with the sample points 240a, 240b and 240c being separated by uniform time intervals. N. For example, N samples can be taken over the duration of the wrapper 10, thereby providing the average fill level 230 over the course of the entire frame period. This can be expressed numerically as follows:

Average Fill Level($t$)={FIFO($t$)+FIFO($t$-1)+ ... FIFO ($t$-$N$)}/$N$

Unlike the conventional method, the averaging scheme provides a more accurate view of the true fill level. It should be obvious that when the sample window is one (N=1), the averaging scheme reduces to the conventional approach and so, in this example N>1.

FIG. 11 shows an exemplary embodiment of how the justification control logic 226 can be organized to implement the averaging scheme. In particular, the justification control logic 226 is provided with summation logic 240, divider logic 242, and justification logic 244. To reduce the complexity introduced by the divider logic 242, one simplification is to right-shift the accumulated value to achieve the desired division. For example, to obtain the average of 1024 samples, the accumulated total could be right shifted by M=log 2(1024)= 10 bits. This method constrains the size of the averaging window to a power of 2 (e.g. 2, 4, 8, etc); however, for all practical purposes, this is not a significant constraint.

Figure 13:
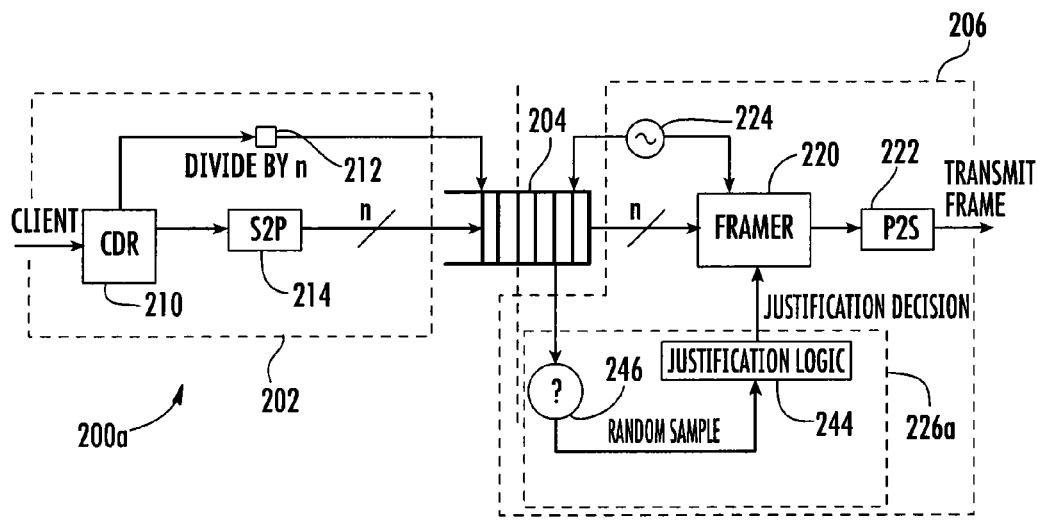
FIG. 13 is a block diagram of another version of a mapping system constructed in accordance with the present disclosure.
Figure 14:
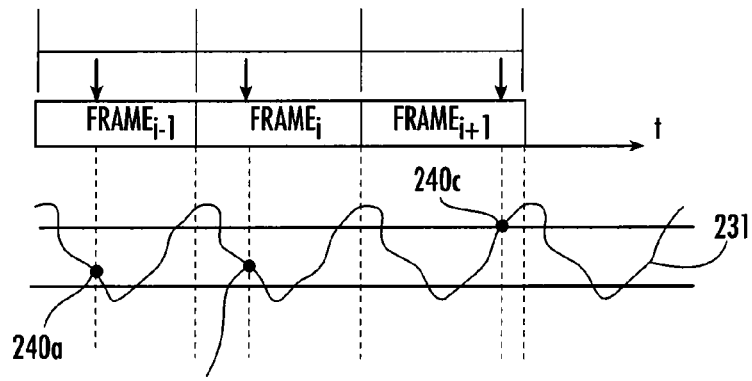
FIG. 14 is a timing diagram illustrating a random sampling of an instantaneous fill level of a memory to make justification decisions.

Referring to FIG. 13, shown therein is another version of a mapping system 206a constructed in accordance with the present disclosure. The mapping system 206a is similar to the mapping system 206 discussed above, with the exception that the mapping system 206a includes a justification control logic 226a which operates differently than the justification control logic 226. In particular, it has been found that the primary problem with the conventional method was in the fact that the justification decision (i.e. sampling of the FIFO) always occurred at a fixed location in the frame 10 (e.g. immediately before the justification opportunity 17) and due to the slight parts per million differences between the two clocks, this sample point shifted slowly in time. The mapping system 206a can decouple the time at which the justification decision is made from the one or more actual justification opportunity 17 in the frame 10. That is, the location of the one or more justification opportunities 17 within the frame 10 is fixed; however, the justification control logic 226a randomly selects the time (or time-period) at which the memory 204 is sampled, e.g., during each successive frame 10, a new sample point may be chosen at random. This is illustrated in FIG. 14.

The embodiment of FIG. 13 is based upon a known theorem of probability named the "Central Limit Theorem", which provides that random samples will converge towards their average. In particular, FIG. 14 illustrates the sampling of the fill level 231 of the memory 204 at sample point 240a during Frame$_{i-1}$, sample point 240b during Frame$_{i}$, and sample point 240c during Frame$_{i+1}$ with the sample points 240a, 240b and 240c being separated by non-uniform time intervals.

The mapping system 200a includes a pseudo-random number generator 246 which generates random numbers that determines when samples are taken of the fill level of the memory 204. For example, the duration of each of the Frame$_{i-1}$, Frame$_{i}$, and Frame$_{i+1}$ may encompass 4000 clock cycles. The pseudo-random number generator 246 can be programmed to generate integers between 0-4000 and the integer can identify a corresponding one of the clock cycles for sampling the fill level of the memory 204. For example, assuming that the pseudo-random number generator 246 generates "345" during the duration of the Frame$_{i-1}$, then the sample point 240a of the fill level of the memory 204 can occur after the 345$^{th}$ clock cycle during the Frame$_{i-1}$. Although only one sample point 240a, 240b, or 240c is shown during each Frame$_{i-1}$, Frame$_{i}$, and Frame$_{i+1}$, it should be understood that multiple sample points can occur during each of the Frame$_{i-1}$, Frame$_{i}$, and Frame$_{i+1}$.

Figure 15:
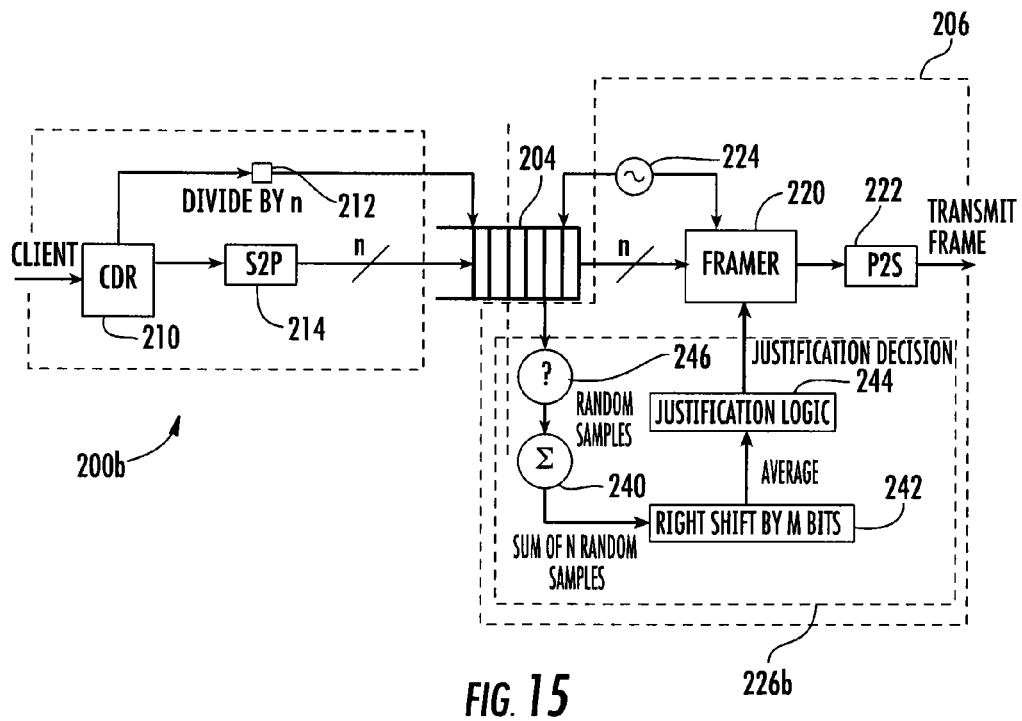
FIG. 15 is a block diagram of yet another version of a mapping system constructed in accordance with the present disclosure.
Figure 16:
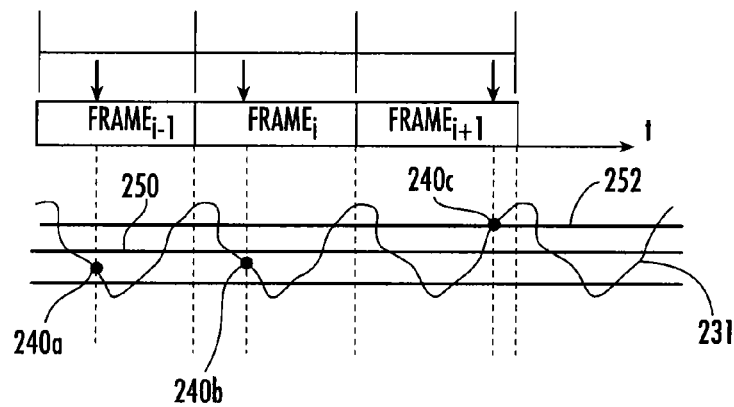
FIG. 16 is a timing diagram illustrating an average fill level based upon sampling of an instantaneous fill level of a memory at random time intervals to make justification decisions.

Referring to FIGS. 15 and 16, shown therein is another version of a mapping system 200b constructed in accordance with the present disclosure. The mapping system 200b is similar to the mapping system 200a discussed above, with the exception that the mapping system 200b includes a justification control logic 226b which operates differently than the justification control logic 226a. That is, one enhancement to the justification control logic 226a, as depicted in FIG. 15 within the justification control logic 226b is to take the average over N non-uniformly spaced, e.g., random samples 240a, 240b and 240c of the fill level 231 of the memory 204, and then to determine an average 250 of the plurality of fill levels utilizing the summation logic 240 and the divider logic 242, for example. Then, the wrapper 10 is generated by the framer 220 including at least a portion of client data with the wrapper 10 having one or more justification opportunities 17 with data based upon the difference between the average 250 and a predetermined threshold 252. This method may be beneficial in systems where FIFO variations are localized in time. The standard averaging approach may fail to incorporate such variations if they happen to fall outside its averaging window. The random averaging approach, on the other hand, will statistically factor in such variations.

CONCLUSION

In digital transport systems it is often advantageous to make use of fixed-length, constant bit-rate wrappers 10 to transport arbitrary clients with equal or less bandwidth requirements. Such wrappers 10 include variable and fixed sections 17 and 18. Fixed stuff sections 18 provide a coarse mapping of the client bit-rate into the wrapper bit-rate. Variable stuff sections 17 (i.e. justification opportunities), provide a fine-grained mechanism for bandwidth matching, as well as allowing the system to transfer temporal variations in the client bit-rate from the ingress of the network 11 into the wrapper bit-rate at the egress of the network 11. Of particular interest are the low-frequency variations, often categorized as wander. Specific standards, such as, SONET/SDH, have strict constraints on the amount of wander that can be generated by the transport system.

The conventional method on making the justification decision relies on sampling the fill level of an asynchronous FIFO memory at a fixed time instant within each mapping of the client payload into the outgoing wrapper 10. In plesiochronous systems, where both the mapper and de-mapper logic operate at the same nominal frequency, sequential oscillations of the fill level over time as shown in FIG. 4 can often contribute to undesirable wander on the regenerated client clock in the conventional method because the samples do not accurately reflect the amount of data actually passing through the FIFO memory 34. The methods described herein minimize the amount of wander generated by the mapping systems 200, 200a and 200b by minimizing the effect of the sequential oscillations of the fill level on the justification decision process. This can be accomplished in a variety of manners, such as by averaging multiple samples of the fill level over time for each justification decision, and/or by taking one or more samples at random time intervals, rather than fixed time intervals.

A first method discussed above with reference to FIG. 11 relies on a flexible averaging window for determining the average fill level 230. Instead of basing the justification decision on the instantaneous FIFO fill level, additional logic is introduced to maintain the average over N consecutive samples, where N>1. The number of samples can be programmable and provides an accurate representation of the true fill level of the memory 204.

A second method discussed above with reference to FIG. 13 works by decoupling the justification decision from the justification opportunity by randomizing the point at which the decision is made. Instead of always sampling the fill level 231 at a fixed location in the frame 10, the sampling occurs at random intervals. Over many frames 10, this method implicitly converges to the true average of the memory 204.

Lastly, a third method discussed above with reference to FIG. 15 merges both of the ideas discussed above. Instead of averaging over N consecutive samples, the samples are taken at random time intervals and their average computed. The method is more resilient to temporal changes in the behavior of the memory 204 that may not be captured by the standard averaging approach and provides faster convergence than the standard randomization approach.

The network 11 can be of various types and utilize various protocols. For example, the network 11 can be an Integrated Services Digital Network (ISDN), or a Public Switched Telephone Network (PSTN), Optical Transport Network (OTN), a Synchronous Optical Network (SONET), or a Synchronous Digital Hierarchy (SDH) network.

The mapping systems 200, 200a, and 200b may be implemented by and/or within one or more components and/or circuitry of the network node 100 and/or 100a at any location in which mapping of the client data into the wrapper 10 occurs. Typically, the mapping will be accomplished within one or more of the input interface 112, or the ingress line module 150; however, the mapping can also be accomplished within one or more of the output interface 114, or egress line module 156, for example.

In one version, part of the mapping system 200 may be implemented as one or more non-transitory computer readable medium storing computer readable instructions that when executed by one or more processor cause the one or more processor to 1) determine each of a plurality of fill levels, each of the plurality of fill levels being associated with an amount of client data in a memory at each of a plurality of corresponding one of a plurality of instants of time, 2) determine an average of the plurality of fill levels, and 3) generate a wrapper including at least a portion of client data from the memory such that the wrapper has one or more justification opportunity having data based upon a difference between the average and a predetermined threshold.

In another version, part of the mapping systems 200a and 200b may be implemented as one or more non-transitory computer readable medium storing computer readable instructions that when executed by one or more processor cause the one or more processor to 1) determine each of a plurality of fill levels, each of the plurality of fill levels being associated with an amount of client data in a memory at each of a plurality of corresponding one of a plurality of instants of time separated by non-uniformly spaced time intervals, and 2) generate a wrapper including at least a portion of client data from the memory such that the wrapper has one or more justification opportunity having data based upon a difference between one or more fill levels and a predetermined threshold.

In particular, the justification control logic 226, 226a and 226b can be implemented as computer readable instructions stored on a non-transitory computer readable medium that when executed by one or more processors cause the one or more processors to execute the functions described herein.

The non-transitory computer readable medium can be a memory (such as random access memory or read only memory), optical and/or magnetic drive, a field programmable gate array (FPGA), an application specific integrated circuit (ASIC) or the like.

The foregoing description provides illustration and description, but is not intended to be exhaustive or to limit the disclosure to the precise form disclosed. Modifications and variations are possible in light of the above teachings or may be acquired from practice of the disclosure.

Also, certain portions of the implementations have been described as "components" that perform one or more functions. The term "component," may include circuits including hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network or hybrid circuit switched/packet switched network.

Even though particular combinations of features are recited in the claims and/or disclosed in the specification, these combinations are not intended to be limiting. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
passing client data through a memory of a network node of a network, the memory including a first-in-first-out memory;
determining each of a plurality of fill levels, each of the plurality of fill levels being associated with an amount of the client data in the memory at each of a corresponding one of a plurality of instants in time;
determining an average of the plurality of fill levels, wherein Average Fill Level(t) is the average of the plurality of fill levels at one of the plurality of instants in time (t), Average Fill Level(t) satisfies:

$$\text{Average Fill Level}(t) = \{\text{FIFO}(t) + \text{FIFO}(t-1) + \ldots \text{FIFO}(t-N)\}/N,$$

where N is a number of the plurality of fill levels, and each of FIFO(t), FIFO(t−1) ... FIFO(t−N) is a respective one of the plurality of fill levels;
generating a wrapper including at least one portion of the client data, the wrapper including a justification opportunity, such that when the average of the plurality of fill levels is below a predetermined threshold, the justification opportunity is stuffed with null data, and when the average of the plurality of fill levels is above the predetermined threshold; a portion of the client data is placed in the justification opportunity; and
transmitting the wrapper onto the network.

2. The method of claim 1, wherein the plurality of instants of time are separated by a uniform time interval.

3. The method of claim 1, wherein the plurality of instants of time are separated by non-uniformly spaced time intervals.

4. The method of claim 3, wherein the non-uniformly space time intervals are determined by a random number generator.

5. The method of claim 1, wherein the memory is a part of an asynchronous mapping system.

6. A method, comprising:
passing client data through a memory of a network node of a network, the memory including a first-in-first-out memory;
determining a plurality of fill levels, each of the plurality of fill levels being associated with an amount of the client data in the memory at each of a corresponding one of a plurality of instants in time separated by non-uniformly spaced time intervals;
generating a wrapper including at least one portion of the client data, the wrapper including a justification opportunity, such that when an average of the plurality of fill levels is below a predetermined threshold, the justification opportunity is stuffed with null data, and when the average of the plurality of fill levels is above the predetermined threshold, a portion of the client data is placed in the justification opportunity; and
transmitting the wrapper onto the network,
wherein Average Fill Level(t) is the average of the plurality of fill levels at one of the plurality of instants in time (t), Average Fill Level(t) satisfies:
Average Fill Level(t)={FIFO(t)+FIFO(t−1)+ . . . FIFO(t−N)}/N, where N is a number of the plurality of fill levels, and each of FIFO(t), FIFO(t−1) . . . FIFO(t−N) is a respective one of the plurality of fill levels.

7. The method of claim 6, wherein the non-uniformly space time intervals are determined by a random number generator.

8. The method of claim 6, wherein the memory is a part of an asynchronous mapping system.

9. A mapping system, comprising:
a memory including a first-in-first-out memory;
a client receive circuit receiving client data from a network, decode the client data and store the client data within the memory; and a frame transmit circuit including:
a justification control logic executed by one or more processor to 1) determine each of a plurality of fill levels, each of the plurality of fill levels being associated with an amount of the client data in the memory at each of a plurality of corresponding one of a plurality of instants of time, and 2) determine an average of the plurality of fill levels;
a framer having circuitry to generate a wrapper including at least a portion of the client data from the memory, the wrapper including a justification opportunity, such that when the average of the plurality of fill levels is below a predetermined threshold, the justification opportunity is stuffed with null data, and when the average of the plurality of fill levels is above the predetermined threshold, a portion of the client data is placed in the justification opportunity, wherein Average Fill Level(t) is the average of the plurality of fill levels at one of the plurality of instants in time (t), Average Fill Level(t) satisfies:

$$\text{Average Fill Level}(t) = \{FIFO(t) + FIFO(t-1) + \ldots FIFO(t-N)\}/N,$$

where N is a number of the plurality of fill levels, and each of FIFO(t), FIFO(t−1) . . . FIFO(t−N) is a respective one of the plurality of fill levels; and a frame transmit circuit to transmit the wrapper onto the network.

10. The mapping system of claim 9, wherein the plurality of instants of time are separated by a uniform time interval.

11. The mapping system of claim 9, wherein the plurality of instants of time are separated by non-uniformly spaced time intervals.

12. The mapping system of claim 11, wherein the non-uniformly space time intervals are determined by a random number generator.

13. An apparatus, comprising:
a non-transitory computer readable medium storing computer readable instructions that when executed by one or more processor cause the one or more processor to 1) determine each of a plurality of fill levels, each of the plurality of fill levels being associated with an amount of the client data in a memory at each of a plurality of corresponding one of a plurality of instants of time, the memory including a first-in-first-out memory 2) determine an average of the plurality of fill levels, 3) generate a wrapper including a justification opportunity, such that when the average of the plurality of fill levels is below a predetermined threshold, the justification opportunity is stuffed with null data, and when the average of the plurality of fill levels is above the predetermined threshold, a portion of the client data is placed in the justification opportunity, and 4) transmit the wrapper onto a network, wherein Average Fill Level(t) is the average of the plurality of fill levels at one of the plurality of instants in time (t), Average Fill Level(t) satisfies:

$$\text{Average Fill Level}(t) = \{FIFO(t) + FIFO(t-1) + \ldots FIFO(t-N)\}/N,$$

where N is a number of the plurality of fill levels, and each of FIFO(t), FIFO(t−1) . . . FIFO(t−N) is a respective one of the plurality of fill levels.

14. The apparatus of claim 13, wherein the plurality of instants of time are separated by a uniform time interval.

15. The apparatus of claim 13, wherein the plurality of instants of time are separated by non-uniformly spaced time intervals.

16. The apparatus of claim 15, wherein the non-transitory computer readable medium stores instructions that when executed by the one or more processor cause the one or more processor to generate random numbers to cause the non-uniformly spaced time intervals.

17. A mapping system, comprising:
a memory, the memory including a first-in-first-out memory;
a client receive circuit receiving client data from a network, decode the client data and store the client data within the memory; and
a frame transmit circuit including:
a justification control logic executed by one or more processor to 1) determine each of a plurality of fill levels, each of the plurality of fill levels being associated with an amount of the client data in the memory at each of a plurality of corresponding one of a plurality of instants of time separated by non-uniformly spaced time intervals; and
a framer having circuitry to generate a wrapper including at least a portion of the client data from the memory, the wrapper including a justification opportunity, such that when an average of the plurality of fill levels is below a predetermined threshold, the justification opportunity is stuffed with null data, and when the average of the plurality of fill levels is above the predetermined threshold, a portion of the client data is placed in the justification opportunity, wherein Average Fill Level(t) is the average of the plurality of fill levels at one of the plurality of instants in time (t), Average Fill Level(t) satisfies:

$$\text{Average Fill Level}(t)=\{\text{FIFO}(t)+\text{FIFO}(t-1)+\ldots \text{FIFO}(t-N)\}/N,$$

where N is a number of the plurality of fill levels, and each of FIFO(t), FIFO(t−1) FIFO(t−N) is a respective one of the plurality of fill levels, wherein the frame transmit circuit transmits the wrapper onto the network.

18. An apparatus, comprising:
a non-transitory computer readable medium storing computer readable instructions that when executed by one or more processor cause the one or more processor to 1) determine each of a plurality of fill levels, each of the plurality of fill levels being associated with an amount of client data in a memory at each of a plurality of corresponding one of a plurality of instants of time separated by non-uniformly spaced time intervals, the memory including a first-in-first-out memory, 2) generate a wrapper including a justification opportunity, such that when an average of the plurality of fill levels is below a predetermined threshold, the justification opportunity is stuffed with null data, and when the average of the plurality of fill levels is above the predetermined threshold, a portion of the client data is placed in the justification opportunity, and 3) transmit the wrapper onto a network, wherein Average Fill Level(t) the average of the plurality of fill levels at one of the plurality of instants in time (t), Average Fill Level(t) satisfies:

$$\text{Average Fill Level}(t)=\{\text{FIFO}(t)+\text{FIFO}(t-1)+\ldots \text{FIFO}(t-N)\}/N,$$

Where N is a number of the plurality of fill levels, and each of FIFO(t), FIFO(t−1) . . . FIFO(t−N) is a respective one of the plurality of fill levels.

19. The apparatus of claim 18, wherein the non-transitory computer readable medium stores instructions that when executed by the one or more processor cause the one or more processor to generate random numbers to cause the non-uniformly spaced time intervals.

* * * * *